3,047,626
Patented July 31, 1962

3,047,626
**4-DESDIMETHYLAMINO-6-DEOXY-TETRA-
CYCLINE DERIVATIVES**
Charles R. Stephens, Jr., Niantic, and Lloyd H. Conover, Quaker Hill, Conn., assignors to Chas. Pfizer & Co., Inc., New York, N.Y., a corporation of Delaware
No Drawing. Filed Sept. 24, 1959, Ser. No. 841,929
4 Claims. (Cl. 260—559)

This invention is concerned with certain novel antimicrobial agents. In particular, it is concerned with 4-desdimethylamino - 6 - deoxytetracycline, 4 - desdimethylamino - 6 - deoxy - 5 - oxytetracycline and 4-desdimethylamino-6-deoxy-6-demethyltetracycline. It is also concerned with a novel intermediate, 4-desdimethylamino-6-demethyltetracycline, which is also an effective antimicrobial agent.

The tetracycline antibiotics are well known valuable compounds possessing a high level of antimicrobial activity and very distinct commercial value as therapeutic agents in the treatment of infectious diseases. The present new compounds are also useful for the treatment of infectious diseases, possessing a generally high activity against gram positive organisms and high activity against certain antibiotic-resistant gram positive organisms. The present compounds have the added advantage of improved acid stability. They may also be used as intermediates in the preparation of other therapeutically effective tetracycline derivatives.

The present new compounds are prepared from the corresponding dimethylamino compounds by procedures known in the art. One such procedure involves treatment with zinc and acid as described in U.S. Patent 2,786,077, or alternatively, treatment with methyl iodide to form the quaternary salt followed by reaction with zinc and acid as described in J.A.C.S. 80, 1657 (1958). For example, 6-deoxy-6-demethyltetracycline on reacting with zinc and acetic acid yields 4-desdimethylamino-6-deoxy-6-demethyltetracycline.

An alternate route to the present final products involves hydrogenolysis of corresponding 4-desdimethylaminotetracyclines. The hydrogenolysis is brought about by treatment with hydrogen in the presence of a noble metal catalyst by the procedure described in copending application, Serial No. 841,928. For example, 4-desdimethylamino-6-demethyltetracycline, a new compound, is treated with hydrogen over palladium to prepare 4-desdimethylamino-6-deoxy-6-demethyltetracycline.

The present new compounds are stable, biologically active substances. The biological activity of 4-desdimethylamino-6-deoxy-6-demethyltetracycline measured by standard serial dilution method is tabulated below.

IN VITRO ANTIBACTERIAL ACTIVITY OF 4-DESDI-
METHYLAMINO-6-DEOXY-6-DEMETHYLTETRACYCLINE

| Organism: | Minimum inhibitory concentration (mcg./ml.) |
|---|---|
| Micrococcus pyogenes var. aureus | 0.78 |
| Streptococcus pyogenes | 1.56 |
| Streptococcus faecalis | 3.12 |
| Diplococcus pneumoniae | 3.12 |
| Erysipelothrix rhusiopathiae | 1.56 |
| Corynebacterium diphtheriae | 1.56 |
| Listeria monocytogenes | 3.12 |
| Bacillus subtilis | 0.39 |
| Lactobacillus casei | 25 |
| Bacterium ammoniagenes | 0.78 |
| Aerobacter aerogenes | 50 |
| Escherichia coli | 25 |
| Proteus vulgaris | 100 |
| Pseudomonas aeruginosa | 100 |
| Salmonella typhosa | 50 |

| Organism—Continued | Minimum inhibitory concentration (mcg./ml.) |
|---|---|
| Salmonella gallinarum | 50 |
| Salmonella pullorum | 50 |
| Klebsiella pneumoniae | 50 |
| Neisseria gonorrhoeae | 1.56 |
| Hemophilus influenzae | 1.56 |
| Shigella sonnei | 50 |
| Erwinia amylovora | 100 |
| Phytomonas tumefaciens | -- |
| Brucella bronchiseptica | 6.3 |
| Malleomyces mallei | 25 |
| Desulfovibrio desulfuricans | 25 |
| Vibrio comma | 0.78 |
| Mycobacterium 607 | 6.3 |
| Mycobacterium berolinense | 12.5 |
| Candida albicans | >100 |
| Pityrosporum ovale Traub | -- |
| Pityrosporum ovale 12078 | >100 |
| Saccharomyces cerevisiae | >100 |
| Streptococcus agalactiae | 3.12 |
| Phytomonas phaseolicola | 25 |

ANTIBIOTIC RESISTANT STRAINS OF *Micrococcus pyogenes* VAR. *aureus*

| | |
|---|---|
| 376 | 1.56 |
| 400 | 1.56 |

The increased acid stability of the compounds of the present invention provides them with a great advantage for the preparation of dosage forms, particularly liquid dosage forms. Aqueous dosage forms having acidic pH's may be prepared in easily administered form. Such solutions are stable at room temperature for prolonged periods of time. The acid stability of the present materials also confers advantages upon them for certain solid formulations such as those containing magnesium chloride and local anesthetics which are commonly used parenterally after reconstitution prior to use.

The present compounds possess in vitro and in vivo microbiological activity different from that of the parent compounds. They may be formulated into various compositions analogous to the parent compounds with the added advantage that they have improved acid stability which provides them with better keeping qualities. Obviously, in order to obtain the advantage of increased acid stability possessed by the present substances, it is necessary to formulate antibiotic compositions whose activity is primarily due to the presence of the instant compound and not to acid sensitive materials such as the tetracycline antibiotics to which they are related. They are useful in therapy, therapeutically in feeds or as growth stimulants, in food preservation, in veterinary practice, and in agriculture. They are especially useful for topical application in therapy.

The present compounds are also useful as chemical intermediates. They may be used for the preparation of 7 or 9 phenylazo tetracyclines by reaction with benzene diazonium halides as described in copending application, Serial Number 802,655, filed March 30, 1959.

The acidic compounds prepared in the fashion described above, are converted to metal salts, and complexes of polyvalent metal salts by methods analogous to those employed with the parent tetracycline antibiotic compounds. The preparation of metal salt complexes is illustrated in application Serial No. 478,498, filed December 29, 1954, now abandoned, and in U.S. Patent 2,640,842. The metal salts are prepared as described in U.S. Patents 2,482,055, 2,516,080 and 2,699,034. Processes for the preparation of specific calcium and magnesium salts are described in Australian Patent Number 201,633. Further, sources of specific procedures and uses for metal salt complexes are described in U.S. Patents 2,736,725, 2,736,735, and 2,791,609.

It is surprising indeed that the present 4-desdimethylaminotetracycline compounds are of such appreciable order of activity, particularly against resistant microorganisms. 4-desdimethylamino - 12a-deoxytetracyclines described by Stephens et al., J.A.C.S., 76, 3570–5 (1954), and Hochstein et al., J.A.C.S., 75, 5466–7 and 5474–5, have an antibacterial spectrum which appreciably differs from that of the present compounds. The minimum inhibitory concentrations (M.I.C.) of 4-desdimethylamino-12a-deoxy-5-oxytetracycline against a variety of organisms, obtained by the serial dilution method, is given below.

| Organism: | M.I.C. (Mcg./ml.) |
|---|---|
| A. aerogenes | 400 |
| Brucella bronchiseptica | 400 |
| E. coli | 400 |
| K. pneumoniae | 400 |
| Staph. aureus | 400 |
| Proteus | 400 |
| Pseudomonas | 400 |
| Salmonella typhosa | 400 |
| St. faecalis | 200 |
| Mycobacterium 607 | 6.25 |
| Mycobacterium berolinense | 6.25 |
| Candida albicans | 400 |

The following examples are given by way of illustration and are not to be construed as limitations of this invention many variations of which are possible without departing from the scope and spirit thereof.

EXAMPLE I

*4-Desdimethylamino-6-Deoxy-6-Demethyltetracycline*

To a solution of 20 g. of 6-deoxy-6-demethyltetracycline methiodide in 300 ml. of acetic acid and an equal volume of water is added 10 g. of zinc dust. The mixture is stirred for 30 minutes, 600 ml. of acetone is added to dissolve the precipitate, and the zinc dust then filtered off, after which 2 liters of water containing 20 ml. of concentrated hydrochloric acid is added to the filtrate. The product which separates after cooling the resulting mixture is collected, dried and recrystallied from ethyl acetate.

The product, on ultraviolet analysis, shows the following:

$\lambda_{max.}=231–2$ m$\mu$   $\log \epsilon=4.17$
$\lambda_{max.}=263$ m$\mu$   $\log \epsilon=4.20$
$\lambda_{max.}=352$ m$\mu$   $\log \epsilon=4.13$
$\lambda_{min.}=236$ m$\mu$   $\log \epsilon=4.02$
$\lambda_{min.}=291–2$ m$\mu$   $\log \epsilon=3.53$ Infrared analysis in a potassium bromide pellet containing 1% of the product shows absorption at the following wavelengths: 6.20, 6.33, 6.87, 7.75 and 8.10.

The product is further characterized by an $R_f$ value of 0.79 in a solvent system composed of 1:1 benzene: chloroform saturated with water as the mobile phase and pH 4.2 buffer as the immobile phase. In the following systems, the product follows the solvent front:

| Mobile phase: | Immobile phase |
|---|---|
| 20:3 toluene:pyridine saturated with pH 4.2 buffer | pH 4.2 buffer |
| Ethyl acetate saturated with water | pH 3.5 buffer |

The buffers referred to in this example are McIlvaine buffers which are described in the literature.

The starting compound 6-deoxy-6-demethyltetracycline methiodide is prepared by the method described in J.A.C.S., 80, 1657 (1958), for tetracycline methiodide except that the product is recovered by stripping the reaction mixture to dryness.

EXAMPLE II

The product of Example I is prepared by the catalytic hydrogenation of 4-desdimethylamino-6-demethyltetracycline as follows. The starting compound, 40 g., in 400 ml. of methanol containing 15 g. of 5% palladium-on-carbon catalyst (50% wet with water) is hydrogenated in a conventional apparatus at a pressure of 1000 p.s.i. of hydrogen at 40° C. with constant agitation. The total reaction consumes a period of about six hours during which time there is a steady fall in pressure until about one mole of hydrogen is absorbed. After the catalyst is removed, the product is obtained by concentration of the mixture.

4-desdimethyl-6-deoxytetracycline and 4-desdimethylamino-6-deoxy-5-oxytetracycline are prepared in an analagous manner.

EXAMPLE III

*4-Desdimethylamino-6-Deoxytetracycline*

A mixture of 10 g. of 6-deoxytetracycline, 100 ml. of glacial acetic acid, 2.5 g. of sodium acetate and 20 g. of zinc dust is stirred for six hours at room temperature. The mixture is filtered and then diluted with 200 ml. of water containing 10 ml. of hydrochloric acid to obtain the product which is separated and dried. The amorphous product is found to be quite pure.

EXAMPLE IV

*4-Desdimethylamino-6-Deoxy-5-Oxytetracycline*

The procedure of Example III is repeated employing as starting material 6-deoxy-5-oxytetracycline to obtain the product.

EXAMPLE V

*4-Desdimethylamino-6-Demethyltetracycline*

This product is obtained by the procedure of Example I from 6-demethyltetracycline, prepared by the procedure described in U.S. Patent 2,878,289.

EXAMPLE VI

Metal salts of the above described 4-desdemethylaminotetracycline compounds are prepared by treatment of the amphoteric compounds with an aqueous solution containing an equivalent amount of metal hydroxide. In this fashion, calcium, barium, magnesium, sodium, potassium, aluminum, zinc and other metal salts are prepared.

EXAMPLE VII

The metal salt complexes of the compounds described in Example I to V are prepared by dissolving the selected compound in a lower aliphatic alcohol preferably methanol, and treating with the appropriate metal salt, preferably dissolved in methanol. The complexes are isolated in some instances by simple filtration, but often, since many of the metal salt complexes are alcohol-soluble, by evaporation of the solvent or addition of a non-solvent such as diethyl ether is necessary to recover the product. The proportion of metal salts as employed is such that one gram atom of metallic ion is present per mole of 4-desdemethylaminotetracycline compound. In this fashion, metal salt compounds are prepared employing the following metal salts: calcium chloride, cobalt chloride, magnesium sulfate, calcium nitrate, magnesium bromide, ferric chloride, zinc chloride, aluminum chloride, mercuric chloride, antimony chloride, calcium phosphate and other such salts.

Of the salts described in Example VI and VII the preferred are alkali and alkaline earth metal salts. Of course the pharmaceutically acceptable alkali and alkaline earth metal salts are useful for administration to human hosts. The pharmaceutically-unacceptable salts are useful for the purification of the present new products and also in the preparation of the pharmaceutically acceptable salts.

This application is a continuation-in-part of application Serial No. 773,172, filed November 12, 1958, which is a continuation-in-part of application Serial No. 699,881, filed December 2, 1957, and now abandoned.

What is claimed is:

1. A compound selected from the group consisting of 4-desdimethylamino-6-deoxytetracycline, 4-desdimethylamino-6-deoxy-5-oxytetracycline, 4-desidimethyl-amino-6-deoxy-6-demethyltetracycline and alkali and alkaline earth metal salts thereof.

2. 4-desidimethylamino-6-deoxy-6-demethyltetracycline.

3. 4-desdimethylamino-6-deoxy-5-oxytetracycline.

4. 4-desdimethylamino-6-deoxytetracycline.

References Cited in the file of this patent

UNITED STATES PATENTS

| | | |
|---|---|---|
| 2,786,077 | Stephens | Mar. 19, 1957 |
| 2,878,289 | McCormick et al. | Mar. 17, 1959 |

FOREIGN PATENTS

| | | |
|---|---|---|
| 1,172,501 | France | Oct. 20, 1958 |
| 787,882 | Great Britain | Dec. 18, 1957 |

OTHER REFERENCES

Stephens et al.: Journ. Am. Chem. Soc., vol. 74, pages 4976–77 (1952).